No. 698,674. Patented Apr. 29, 1902.
T. DUNCAN.
ALTERNATING CURRENT METER.
(Application filed Nov. 24, 1899.)
(No Model.) 2 Sheets—Sheet 2.
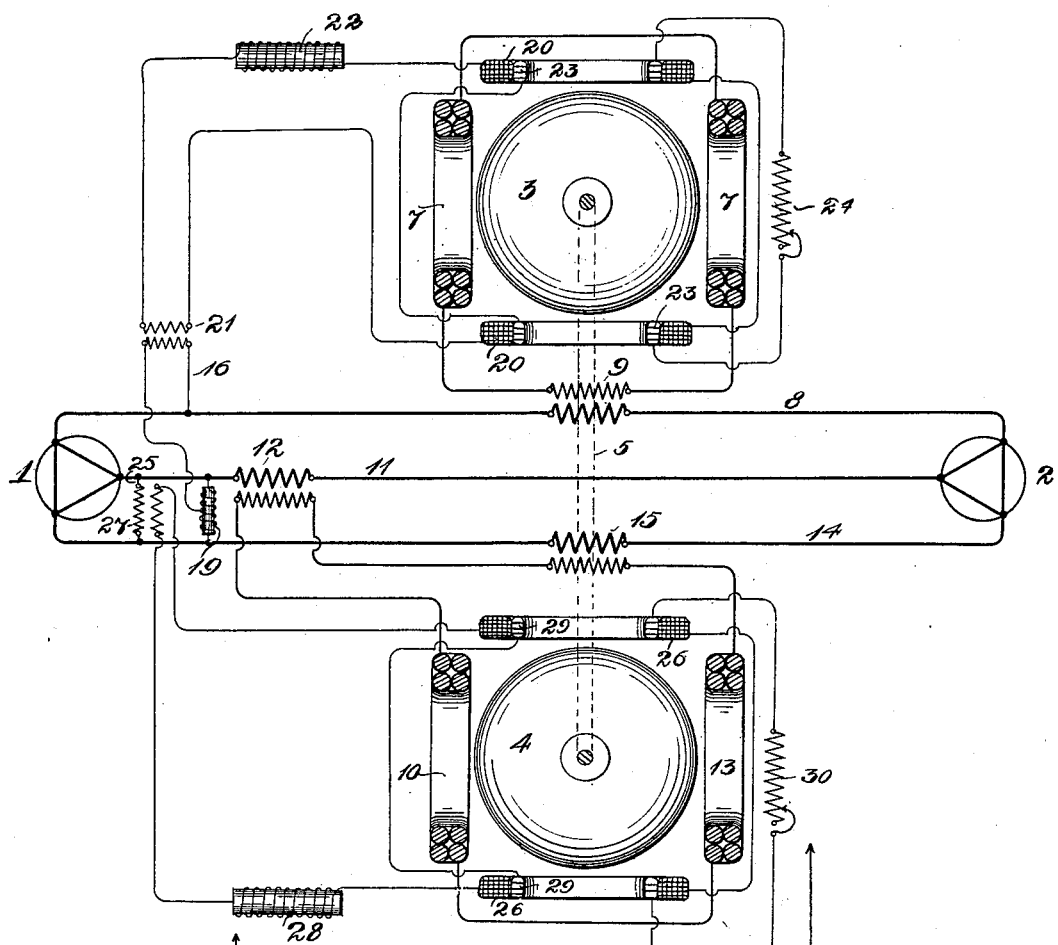
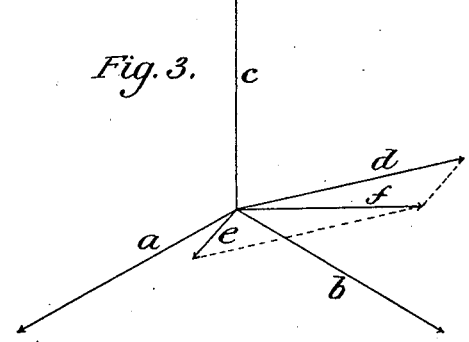
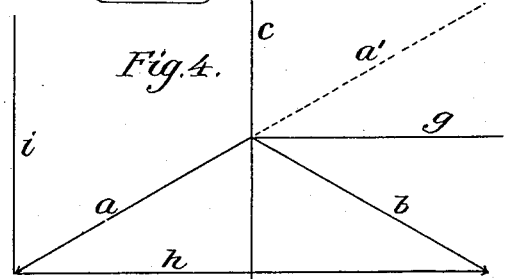
Witnesses
Inventor
Thomas Duncan
By Charles A. Brown & Cragg
Attorneys

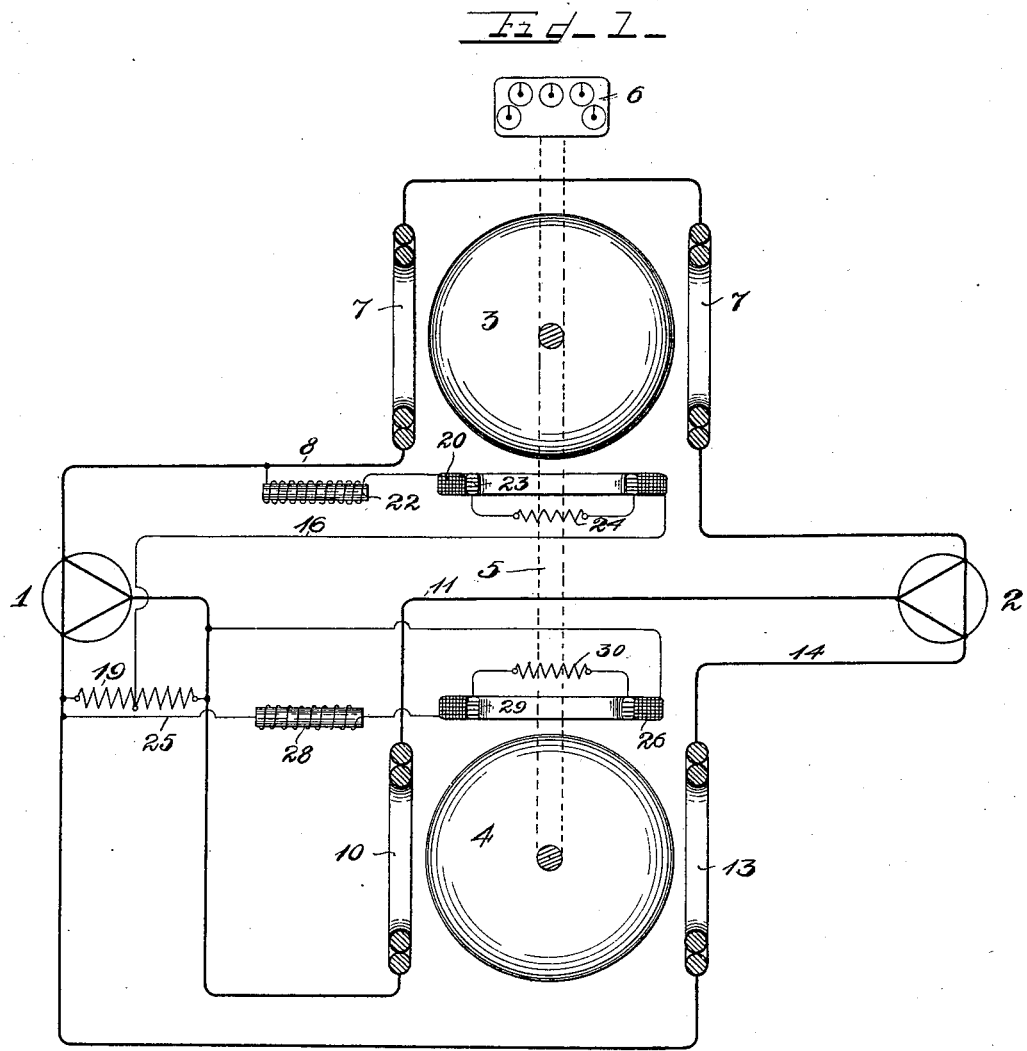

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,674, dated April 29, 1902.

Application filed November 24, 1899. Serial No. 738,172. (No model.)

*To all whom it may concern:*

Be it known that I, THOMAS DUNCAN, a citizen of the United States, residing at Chicago, in the county of Cook and State of Illinois, have invented a certain new and useful Improvement in Alternating-Current Meters, (Case No. 325,) of which the following is a full, clear, concise, and exact description, reference being had to the accompanying drawings, forming a part of this specification.

My invention relates to motor-meters, and has for its object the provision of an improved watt motor-meter for measuring alternating current in a multiphase system of electrical distribution.

My invention in its preferred embodiment is adapted to measure the current in a three-phase three-wire system of alternating-current distribution.

In practicing my invention I preferably employ three current-windings, each transmission-conductor furnishing a winding with current. In the preferred embodiment of the invention these current-windings create three fields which are proportional to and vary in phase with the three currents of the system. Assuming that the system is balanced, these fields are displaced one hundred and twenty degrees from each other. In practicing my invention I have also included two field-coils of the system together in series with secondary windings of transformers receiving current from two mains of the system, whereby the resultant of the two currents in the secondaries of the transformers caused a single field. I associate a pressure-winding with one of the current-windings to produce a field proportional to a resultant of two pressures of the system, which field, in coöperation with the field due to said current-winding, is capable of creating a torque upon the measuring element. I associate a second pressure-winding with the remaining two current field windings or coils to produce a field which, in coöperation with the field or fields due to these two current-coils, creates another torque upon the measuring element. The two torques act conjointly upon the measuring element to produce motion therein, which measures the "real" or "true" watts of the three-phase system irrespective of the conditions of load and at all power factors.

In the preferred embodiment of my invention I employ an induction-motor as an element of the instrument, two armatures being preferably employed, one in inductive relation with the first aforesaid pressure-winding and its associated current field-winding, while the other is in inductive relation with the second pressure-winding and the two remaining current field-coils coöperating therewith. The two armatures are mechanically coupled, being preferably mounted upon a common shaft, which serves to actuate a measuring device or recording-train.

I will explain my invention more particularly by reference to the accompanying drawings, illustrating preferred embodiments thereof as applied to induction motor-meters, in which—

Figure 1 diagrammatically illustrates a three-phase system of electrical distribution with the meter of my invention connected therewith. Fig. 2 diagrammatically illustrates a three-phase system of electrical distribution for supplying heavy current at high voltage with the meter of my invention associated therewith. Figs. 3 and 4 are phase and vector diagrams illustrating the electrical principles involved.

Like parts are indicated by similar characters of reference in all the views.

A three-phase alternating-current generator 1 supplies current by three conductors to a district of consumption, a motor 2 being shown as a translating device in circuit therewith. Two cup-shaped armatures 3 and 4 are indicated in this instance, these armatures being mounted upon a common rotating shaft or spindle 5. The instrument illustrated in this instance is a recording and integrating meter, a counting-train 6 being geared to the spindle. A series or current winding 7 is indicated in circuit with a transmission-main 8, as shown in Fig. 1, or is included in circuit with the secondary of a transformer 9, whose primary is included in series with the conductor 8, as shown in Fig. 2. The current-winding 7 is preferably divided into two coils located, preferably, upon diametrically opposite sides of the armature 3.

Referring to Fig. 1, a second current-coil 10 is included in series with the transmission-conductor 11. A third current-winding 13 is included in series with the transmission-conductor 14. Assuming that the system is balanced, the resultant field due to the coils 10 and 13 is displaced sixty degrees in phase from the current in either of the said coils. The arrangement of the current field-coils 10 and 13 of the apparatus shown in Fig. 2 differs from the arrangement shown in Fig. 1 in that two transformers 12 and 15 are employed, the secondaries of these transformers and the current-windings 10 and 13 being included in series in a single circuit. One armature 3 is inductively associated with the coils of one field-winding 7, while the armature 4 is inductively associated with the coils 10 and 13.

To create a field proportional to the electromotive force to coöperate with the field due to the winding 7, I connect one end of a shunt-conductor 16 with a main 8, the other end of the conductor being connected with a compensating winding 19 about midway between the ends thereof, this compensator being connected in bridge of the mains 11 and 14. The winding 19 is shown in Fig. 1 as being non-inductive and of high resistance. In Fig. 2 the winding 19 is arranged in the form of an impedance-coil. By this means I am enabled to impress an electromotive force upon the conductor 16, which is in phase with the current in conductor 8, it being assumed that there is no reactance in the system.

In the form of the invention shown in Fig. 1 the pressure-winding 20 is included in metallic circuit with the bridge conductor 16. In Fig. 2 the said pressure-winding is shown as being included in circuit with the secondary of a transformer 21, whose primary is included in metallic circuit with the bridge conductor 16. In Fig. 1 pressure-winding 20 is formed in one coil, while in Fig. 2 the said pressure-winding is subdivided into two coils, placed upon opposite sides of the armature and at right angles with respect to the coils 7. The instrument shown being an induction motor-meter, it becomes essential to secure a phase displacement of the pressure field ninety degrees away from the pressure impressed upon the circuit including the pressure-winding, or ninety degrees away from the field due to the current-winding, there being no reactances in the transmission-conductors, for which purpose a variety of means may be employed. I have shown in both figures reactance in the form of an impedance-coil 22, included in series with the pressure-winding 20, to lag the current therethrough to as near ninety degrees as possible. To obtain exact quadrature between the pressure field and the pressure impressed upon the circuit including the pressure-winding, I may employ a secondary winding 23, constituting a single coil in the apparatus of Fig. 1 and being subdivided into two coils in the apparatus shown in Fig. 2, the secondary windings being inductively associated with the pressure-windings 20. The winding 23 is preferably short-circuited through an adjusting non-inductive resistance 24. By adjustment of the resistance 24 a resultant magnetic pressure field may be produced that will have the required phase displacement.

I will now describe the pressure-winding associated with the current-windings 10 and 13.

A conductor 25 is shown in each figure as being in bridge between the transmission-conductors 11 and 14. In Fig. 1 the pressure or shunt field-winding 26 is included in the conductor 25, while in Fig. 2 the said conductor includes the primary coil of a transformer 27, the secondary of said transformer being included in circuit with the pressure-winding 26. In Fig. 1 the pressure-winding 26 is formed in a single coil, while in Fig. 2 said winding is subdivided into two coils placed upon opposite sides of the armature 4 and at right angles with respect to the current-coils 10 and 13. The pressure impressed upon the circuit including the pressure-winding 26 is in phase with the resultant field due to the coils 10 and 13, these coils forming a single winding, producing a resultant field—that is, either of the coils 10 or 13 is reversely connected in order to effect the desired measurement, as will be more fully set forth hereinafter. I preferably include impedance 28 in series with the said pressure-winding 26 to lag the current through the same as near ninety degrees as possible away from the pressure between the conductors 11 and 14. To create a pressure field in exact quadrature with this pressure, I employ a secondary winding 29 and short-circuit it through an adjusting resistance 30. By adjusting the resistance 30 exact quadrature may be obtained between the pressure field and the pressure. In Fig. 1 I have shown the winding 29 formed of a single coil. In Fig. 2 said winding is shown as being subdivided into two coils, the adjusting resistance 30 being included in series with them.

The current and pressure relations will be more clearly understood by reference to Figs. 3 and 4. In these figures, $a$, $b$, and $c$ represent the currents in the conductors 11, 14, and 8, respectively. The pressure impressed on the circuit 16 is in phase with the current in conductor 8 and is represented by line $c$, Fig. 3, with non-inductive loading of the system. The impedance-coil 22 serves to lag the current through circuit 26, which current may be represented by line $d$. To further lag the field through the said shunt-circuit, I employ the auxiliary coil 23, whose magnetic effect may be represented by line $e$. The resultant magnetism due to the circuit 16 is then indicated by line $f$ and is in quadrature with the current through series winding 7, as represented by line $c$, Fig. 3. Referring now to Fig. 4, I have indicated the connections of coil 10 as reversed, so that the magnetic effect of the said coil may be represented by the dotted line $a'$. The resultant field due to the two current-coils 10 and 13 would, therefore, not lie along a line one hundred and eighty degrees displaced from the current in the conductor 8, but would lie along a line $g$, which is in quadrature therewith. The pressure impressed upon the circuit 25 is represented by line $h$, which is parallel to the resultant series field $g$. In order to secure an actuation of the measuring element, I lag the current through said circuit by means of the impedance 28 and the auxiliary coil 29, so that the magnetic effect due to said circuit 25 may represented by the line $i$, which is in quadrature with the resultant series field $g$.

I am thus enabled to produce a meter for a three-phase system of alternating-current distribution employing field-windings supplied with current from the three transmission-mains of the system and two pressure-windings associated with these field-windings, which in coöperation therewith are adapted to create two torques adapted to actuate a measuring element to measure the power in the system. In the apparatus of Fig. 2 it is understood, of course, that the relative phase relations of the resultant fields remain unchanged, the transformers serving simply to substantially reverse all of the currents in the secondary circuits, the latter being displaced approximately one hundred and eighty degrees from the primary currents. Any irregularities in the phase relations due to losses in the transformers may be compensated for by the readjustment of the various resistances and reactances employed.

It will of course be understood that only one of the two armatures, together with its associated windings, will correctly measure the energy consumed in the system so long as the system is balanced, and my invention contemplates the use of only one of the said armatures, together with its associated windings, or, in other words, only one of the two elements which go to make up the meter, as illustrated in the drawings; but when the system becomes unbalanced then, because the meter-windings are included in only one or two of the three-phase mains, the meter will no longer register accurately. I therefore prefer to construct the meter with a current-coil connected in each of the three mains, so that any change in load in either of the branches of the system will change the current-flow in one or more of the meter-windings, with the result that an accurate measurement of the energy consumed is effected under all conditions.

It is obvious that changes may readily be made in the preferred embodiments of my invention herein shown and particularly described, and I do not therefore wish to be limited to the precise details shown; but,

Having thus described my invention, I claim as new and desire to secure by Letters Patent—

1. In a three-phase system of alternating-current distribution, the combination with a current-winding supplied with current from one of the transmission-conductors, of a second current field-winding supplied with current from the remaining transmission-conductors, a pressure-winding associated with each of said current-windings, a measuring element subjected to the action of the fields due to the said windings, and means associated with the circuits including the pressure-windings for maintaining the fields due to the pressure-windings substantially in quadrature with the pressure upon the circuits including the same, substantially as described.

2. In a polyphase system of electrical distribution, the combination with a source of polyphase alternating current, of transmission-conductors for conveying polyphase currents, a current-winding producing a field proportional to the current in one transmission-conductor, a pressure-winding producing a field proportional to the resultant of two pressures impressed on said transmission-conductors, the said two windings serving conjointly to exert torque upon an armature, a second current-winding producing a field proportional to the resultant of two currents of displaced phase traversing said transmission-conductors, a second pressure-winding producing a field proportional to the pressure of one of the circuits impressed on said transmission-conductors, the last two aforesaid energizing-windings serving together to exert torque upon an armature, and a measuring element subject to the action of the said torques, substantially as described.

3. In a polyphase system of electrical distribution, the combination with a source of polyphase alternating current, of transmission-conductors for conveying polyphase currents, a current-winding producing a field proportional to the current in one transmission-conductor, a pressure-winding producing a field proportional to the resultant of two distinct pressures impressed on said transmission-conductors, a second current-winding producing a field proportional to the resultant of two out-of-phase currents traversing two separate transmission-conductors, a second pressure-winding producing a field proportional to the pressure of a circuit impressed on said transmission-conductors, a measuring element[7] inductively associated with said field-windings to measure the power of the system, and means for maintaining the fields due to the pressure-windings in quadrature with the pressures impressed on their respective circuits, substantially as described.

4. In a system of alternating-electric-current distribution, the combination with a source of three-phase alternating current in circuit with the three transmission-mains of the system, of a current field-winding receiving current from one of the mains, a compensator 19 between the remaining two mains, a conductor 16 receiving current from said compensator and the first aforesaid transmission-main, a second field-winding receiving its current from said conductor, and an armature subject to said fields, the said fields by their conjoint action serving to exert torque upon said armature, substantially as described.

5. In a system of alternating-electric-current distribution, the combination with a source of three-phase alternating current in circuit with the three transmission-mains of the system, of a current field-winding receiving current from one of the mains, a compensator 19 between the remaining two mains, a conductor 16 receiving current from said compensator and the first aforesaid transmission-main, a second field-winding receiving its current from said conductor, a motive element inductively acted upon by the fields due to the field-windings, and means for adjusting the phase relation of said fields, substantially as described.

6. In a system of alternating-electric-current distribution, the combination with a source of three-phase alternating current in circuit with the three transmission-mains of the system, of a current field-winding receiving current from one of said mains, a compensator between the remaining two mains, a conductor extending between an intermediate portion of said compensator and the first aforesaid transmission-main, a second field-winding receiving its current from said conductor, and a motive element subjected to the action of said fields, substantially as described.

7. In a system of alternating-electric-current distribution, the combination with a source of three-phase alternating current in circuit with the three transmission-mains of the system, of a current field-winding receiving current from one of said mains, a compensator between the remaining two mains, a conductor extending between an intermediate portion of said compensator and the first aforesaid transmission-main, a second field-winding receiving its current from said conductor, a motive element inductively acted upon by the fields due to the field-windings, and means for adjusting the phase relation of the fields, substantially as described.

8. In a system of alternating-current distribution, the combination with two conductors, of means for supplying the same with alternating currents differing in phase, a current field-winding supplied with current from each of said mains and serving to produce a field which is proportional to the resultant of the currents in said mains, a pressure field-winding serving to create a second field proportional to the pressure between said conductors, a movable element inductively acted upon by the fields due to the field-windings, and means for adjusting the phase relation of the fields, substantially as described.

9. In a system of alternating-current distribution, the combination with a source of three-phase current in circuit with the mains of the system, of a current field-winding supplied with out-of-phase currents from two of the mains and serving to produce a field proportional to the resultant of the currents in the latter mains, a pressure field-winding serving to create a field proportional to the pressure between the latter two windings, a movable element inductively acted upon by the fields due to the field-windings, and means for adjusting the phase relations of the fields, substantially as described.

10. In a system of electrical distribution, the combination with a source of three-phase current in circuit with the three transmission-mains of the system, of a current field-winding receiving current from one of the mains of the system, a pressure field-winding adapted to create a pressure field proportional to the resultant of the pressures between the latter main and each of the other mains of the system, a second current-winding receiving current from each of the remaining mains of the system and serving to create a field proportional to the resultant of the currents in the latter mains, a second pressure-winding for creating a field proportional to the pressure between the latter mains, and a measuring element subjected to the action of said fields to measure the power of the system, substantially as described.

11. In a system of electrical distribution, the combination with a source of three-phase current in circuit with the three transmission-mains of the system, of a current field-winding receiving current from one of the mains of the system, a pressure field-winding adapted to create a pressure field proportional to the resultant of the pressure between the latter main and each of the other mains of the system, a second current-winding receiving current from each of the remaining mains of the system and serving to create a field proportional to the resultant of the currents in the latter mains, a second pressure-winding for creating a field proportional to the pressure between the latter mains, an armature associated with the first two field-windings, and a second armature subjected to the second two field-windings to measure the power of the system, substantially as described.

12. In a system of electrical distribution, the combination with a source of three-phase current in circuit with the three transmission-mains of the system, of a current field-winding receiving current from one of the mains of the system, a pressure field-winding adapted to create a pressure field proportional to the resultant of the pressure between the latter mains and each of the other mains of the system, a second current-winding receiving current from each of the remaining mains of the system and serving to create a field proportional to the resultant of the currents in the latter mains, a second pressure-winding for creating a field proportional to the pressure between the latter mains, an armature associated with the first two field-windings, a second armature subjected to the second two field-windings to measure the power of the system, and a measuring element, said armature coöperating with the measuring element to measure the power in the system, substantially as described.

13. In a system of electrical distribution, the combination with a source of three-phase current in circuit with the three transmission-mains of the system, of a current field-winding receiving current from one of the mains of the system, a pressure field - winding adapted to create a pressure field proportional to the resultant of the pressures between the latter main and each of the other mains of the system, a second current-winding receiving current from each of the remaining mains of the system and serving to create a field proportional to the resultant of the currents in the latter mains, a second pressure-winding for creating a field proportional to the pressure between the latter mains, a measuring element inductively acted upon by said fields, and means for adjusting the phase relations of the fields, substantially as described.

14. In a system of electrical distribution, the combination with a source of three-phase current in circuit with the three transmission-mains of the system, of a current field-winding receiving current from one of the mains of the system, a pressure field-winding adapted to create a pressure field proportional to the resultant of the pressures between the latter mains and each of the other mains of the system, a second current-winding receiving current from each of the remaining mains of the system and serving to create a field proportional to the resultant of the currents in the latter mains, a second pressure-winding for creating a field proportional to the pressure between the latter mains, an armature being inductively associated with the said field-windings, a second armature subjected to the second two field-windings to measure the power of the system, a measuring element, said armatures being inductively associated with said field-windings to measure the power of the system, and means for adjusting the phase relations of the fields, substantially as described.

15. In a polyphase system of electrical distribution, the combination with a source of polyphase alternating current, of a current-winding producing a field proportional to the current in one transmission-conductor, a pressure-winding producing a field proportional to and displaced substantially ninety degrees from the resultant of two pressures of the system, said windings serving conjointly to exert torque upon an armature, a second current-winding producing a field proportional to the resultant of two currents of the system, a second pressure-winding producing a field displaced substantially ninety degrees from the pressure of one circuit of the system, said pressure-winding receiving its current from the two mains of the system including the coils of the last aforesaid current-winding, and a measuring element subject to the action of said fields to measure the power of the system, substantially as described.

16. In a polyphase system of electrical distribution, the combination with a source of polyphase current, of a current-winding producing a field proportional to the current in one transmission-conductor, a pressure-winding producing a field proportional to the resultant of two pressures of the system coöperatively associated with said current-winding, an armature subject to the torque created by the conjoint action of said fields, a second current-winding producing an effective field proportional to the resultant of two currents of the system, a second pressure-winding producing a field proportional to the pressure of one circuit of the system, the said second pressure-winding receiving its current from the mains including coils of the last aforesaid current-winding, and a second armature subject to the torque produced by the conjoint action of said latter fields, substantially as described.

17. In a three-phase system of electrical distribution, the combination with a source of three-phase alternating current, of a current-winding producing a field proportional to the current in one transmission-conductor, a pressure-winding producing a field proportional to the resultant of two pressures of the system coöperatively associated with said current-winding, a second current-winding producing a field proportional to the resultant of two currents of the system, a second pressure-winding producing a field proportional to the pressure between the two remaining transmission-conductors of the system associated with said second current-winding, the said second pressure-winding receiving its current from the mains including the coils of the second current-winding and a measuring element subject to the torque produced by the first aforesaid set of fields and also to the torque of the last aforesaid set of fields, substantially as described.

18. In a three-phase system of electrical distribution, the combination with a source of three-phase current, of a motor-meter having two armatures, a current field-winding supplied with current from one of the transmission-conductors associated with one of said armatures, a second current field-winding supplied with current from the remaining transmission-conductors associated with the second armature, and a pressure-winding associated with each of said current-windings, the pressure-winding associated with the last aforesaid current field-winding receiving its current from the two transmission-conductors of the system including the coils of the said second current field-winding, substantially as described.

19. In a polyphase system of alternating-current distribution, the combination with a current-winding supplied with current from said system, of a compensator connected between two of the mains, a pressure-winding coöperatively associated with said current-winding receiving its current from a conductor extending between an intermediate portion of said compensator and a transmission-main, means for maintaining the field due to the pressure-winding substantially in quadrature with the pressure impressed on its circuit, and a measuring element subject to the action of said fields, substantially as described.

20. In a system of alternating-current distribution, the combination with a source of three-phase current in circuit with the mains of the system, of a current field-winding supplied with out-of-phase currents from two of the mains and serving to produce a field proportional to the resultant of the currents in the latter mains, a pressure field-winding serving to create a field proportional to the pressure between the latter two windings, a movable element subject to the conjoint action of said windings, and means for maintaining the field due to the pressure-winding in quadrature with the pressure impressed on the terminals of the pressure-circuit, substantially as described.

21. In a system of polyphase-alternating-current distribution, the combination with a source of current connected to transmission-mains, of a current field-winding receiving current from one main of said system, a pressure-winding receiving its current from said main and associated mains, thereby to create a field proportional to the resultant of two pressures of the system, and an armature subject to the conjoint action of said fields, substantially as described.

22. In a polyphase system of electrical distribution, the combination with a source of polyphase current, of a current-winding producing a field proportional to the current in one transmission-conductor, a pressure-winding producing a field proportional to the resultant of two pressures of the system coöperatively associated with said current-winding, an armature subject to the torque created by the conjoint action of said fields, a second current-winding producing an effective field proportional to the resultant of two currents of the system, a second pressure-winding producing a field proportional to the pressure of one circuit of the system, the said second pressure-winding receiving its current from the transmission-conductors including the coils of the second aforesaid current-winding, a second armature subject to the torque produced by the conjoint action of said latter fields, and a single measuring element actuated by both of said armatures, substantially as described.

23. In a system of polyphase-alternating-current distribution, the combination with a source of current connected to transmission-mains, of a current field-winding receiving current from one main of said system, a pressure-winding receiving its current from said main and associated mains, thereby to create a field proportional to the resultant of two pressures of the system, an armature subject to the conjoint action of said fields, and means for maintaining the field due to the pressure-winding in quadrature with the pressure impressed on the terminals of the pressure-circuit, substantially as described.

24. In an induction-meter for three-phase circuits, a main current-winding comprising a plurality of sections suitably connected to the three-phase mains, a shunt-winding connected across points, the potential between which is in phase with the resultant of the currents in the sections of the main current-winding on non-inductive load, and means for causing the magnetic field due to the shunt-winding to be displaced by substantially ninety degrees from electromotive force impressed upon the shunt-circuit.

25. In an induction-meter for three-phase circuits, a main current-winding comprising a plurality of coils each connected in circuit with one of the three-phase mains, a shunt-winding connected between two of the mains, and means for causing the field due to the shunt-winding to be displaced by substantially ninety degrees from the electromotive force impressed upon the shunt-circuit.

26. In an induction-meter for three-phase circuits, a main current-winding comprising two coils each connected in circuit with one of the three-phase mains, a shunt-winding connected between the mains in which the series coils are included, and means for causing the field due to the shunt-winding to be displaced by substantially ninety degrees from the electromotive force impressed on the shunt-circut.

In witness whereof I hereunto subscribe my name this 22d day of November, A. D. 1899.

THOMAS DUNCAN.

Witnesses:
WM. F. MEYER,
JAMES W. DALTON.